US012748829B2

(12) United States Patent
Lee

(10) Patent No.: US 12,748,829 B2
(45) Date of Patent: Sep. 29, 2026

(54) DEVICE AND METHOD FOR USER AUTHENTICATION IN VEHICLE BASED ON SPEECH RECOGNITION

(71) Applicants: Hyundai Motor Company, Seoul (KR); Kia Corporation, Seoul (KR)

(72) Inventor: Ran Lee, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 73 days.

(21) Appl. No.: 18/587,139

(22) Filed: Feb. 26, 2024

(65) Prior Publication Data

US 2025/0077637 A1 Mar. 6, 2025

(30) Foreign Application Priority Data

Aug. 28, 2023 (KR) ........................ 10-2023-0112901

(51) Int. Cl.

*G06F 21/32* (2013.01)
*G10L 17/02* (2013.01)
*G10L 17/04* (2013.01)
*G10L 17/06* (2013.01)
*G10L 17/20* (2013.01)
*G10L 25/18* (2013.01)

(52) U.S. Cl.

CPC .............. *G06F 21/32* (2013.01); *G10L 17/02* (2013.01); *G10L 17/04* (2013.01); *G10L 17/06* (2013.01); *G10L 17/20* (2013.01); *G10L 25/18* (2013.01)

(58) Field of Classification Search

CPC ........ G06F 21/32; G06F 3/167; G06F 3/0488; G06F 21/31; G06F 3/165; G10L 15/22; G10L 2015/223; G10L 17/04; G10L 21/0208; G10L 15/20; G10L 19/22; G10L 2021/02165; G10L 21/0272; B60R 25/257; B60R 16/0373; B60R 11/0247

See application file for complete search history.

(56) References Cited

U.S. PATENT DOCUMENTS

| | | | | |
|---|---|---|---|---|
| 10,534,819 | B2 * | 1/2020 | Ricci | G06F 16/951 |
| 11,557,301 | B2 * | 1/2023 | Sharifi | G10L 15/22 |
| 11,743,719 | B2 * | 8/2023 | Kashani | H04L 63/102 |
| 2015/0248881 | A1 * | 9/2015 | Holdren | G10L 15/06<br>704/260 |
| 2016/0267901 | A1 * | 9/2016 | Zhao | G10L 13/027 |
| 2018/0174590 | A1 * | 6/2018 | Kurian | G10L 17/02 |
| 2018/0201226 | A1 * | 7/2018 | Falkson | B60R 25/257 |
| 2019/0180740 | A1 * | 6/2019 | Nandy | G10L 15/30 |
| 2020/0286489 | A1 * | 9/2020 | Park | G10L 13/00 |
| 2021/0075787 | A1 * | 3/2021 | Zhang | H04L 63/0861 |

(Continued)

*Primary Examiner* — Techane Gergiso

(74) *Attorney, Agent, or Firm* — Fox Rothschild LLP

(57) ABSTRACT

A method and a device perform user authentication of an occupant in a vehicle based on speech recognition. The device includes a memory that stores a reference embedding set including a feature embedding for a registered user's utterance and feature embeddings for synthesis results between the registered user's utterance and a plurality of environmental noises. The device also includes a user interface that receives input audio including utterance of an occupant of the vehicle and noise, and a processor that transforms the input audio to an input embedding and determines whether the occupant is a registered user based on a comparison between the input embedding and the reference embedding set.

17 Claims, 5 Drawing Sheets

(56) References Cited

U.S. PATENT DOCUMENTS

| | | | | |
|---|---|---|---|---|
| 2021/0105619 | A1* | 4/2021 | Kashani | G10L 15/25 |
| 2021/0280182 | A1* | 9/2021 | Choi | G10L 15/22 |
| 2021/0326421 | A1* | 10/2021 | Khoury | G06N 3/045 |
| 2022/0292134 | A1* | 9/2022 | Shahbazi Mirzahasanloo | G06F 21/32 |
| 2024/0212689 | A1* | 6/2024 | Mohammad | G10L 21/028 |
| 2025/0006175 | A1* | 1/2025 | Coppo | G10L 25/60 |

* cited by examiner

DEVICE AND METHOD FOR USER AUTHENTICATION IN VEHICLE BASED ON SPEECH RECOGNITION

CROSS REFERENCE TO RELATED APPLICATION

This application claims under 35 U.S.C. § 119(a) the benefit of Korean Patent Application Number 10-2023-0112901, filed on Aug. 28, 2023 in the Korean Intellectual Property Office, the entire contents of which are incorporated herein by reference.

BACKGROUND

(a) Technical Field

The present disclosure relates to a method and device for user authentication in a vehicle based on speech recognition, more particularly, to the method and device for authenticating a user that takes into account background noise in the vehicle.

(b) Description of the Related Art

An intelligent transportation system (ITS) includes vehicles capable of wireless communication (e.g., WiFi, 3G, LTE, 5G, NR system, etc.) that are configured to communicate from one vehicle to another and between vehicles and outside infrastructures according to various service types. of the vehicles may include one or more electronic control units (ECUs) for carrying out consumer service demands and various functions.

As speech recognition technology has developed, the use of speech recognition assistant services that recognize voice commands generated by a user's speech and perform corresponding commands has significantly increased. The application of speech recognition assistant services has expanded from home to vehicles and other fields. In other words, speech recognition assistant services and telematics services are linked and voice commands generated by the users' speech are transmitted to vehicles to control the vehicles. Through this, users may lock/unlock doors of vehicles or control internal temperatures of vehicles by turning on air-conditioners in advance.

In order to use such a speech recognition assistant service, user authentication is required. This is because, without user authentication, there is a possibility that an unauthorized person may use vehicles without permission.

As the related art user authentication method, there is a method of inducing an occupant to utter a predetermined sentence and comparing the occupant's voice utterance with the occupant's pre-registered voice utterance to allow the occupant to access.

However, if noise occurs due to a vehicle environment, such as noise from an air conditioner operating in a vehicle or noise from precipitation such as rain, the performance of user authentication may deteriorate.

Therefore, there is a need for a method to perform more accurate user authentication within a vehicle.

SUMMARY

According to at least one embodiment, the present disclosure provides a device for user authentication of an occupant in a vehicle. The device comprises a memory configured to store a reference embedding set including a feature embedding for a registered user's utterance and feature embeddings for synthesis results between the registered user's utterance and a plurality of environmental noises. The device further comprises a user interface (e.g., microphone) configured to receive input audio including an utterance of an occupant of the vehicle and noise, and a processor configured to transform the input audio to an input embedding and determine whether the occupant is a registered user based on a comparison between the input embedding and the reference embedding set.

A vehicle may include the device for user authentication of the occupant of the vehicle.

According to another embodiment of the present disclosure provides a computer implementation method for user authentication of a vehicle. The computer implementation method comprises receiving, by a user interface (e.g., a microphone) input audio including an utterance of an occupant of the vehicle and noise, and transforming, by a processor, the input audio to an input embedding. The computer implementation method further comprises determining, by the processor, whether the occupant is a registered user based on a comparison between the input embedding and a pre-stored reference embedding set, the reference embedding set including a feature embedding for the registered user's utterance and feature embeddings for synthesis results between the registered user's utterance and a plurality of environmental noises.

According to a further embodiment, a non-transitory computer readable medium contains program instructions executed by a processor, including: program instructions that receive input audio including an utterance of an occupant of the vehicle and noise, program instructions that transform the input audio to an input embedding, and program instructions that determine whether the occupant is a registered user based on a comparison between the input embedding and a pre-stored reference embedding set, the reference embedding set including a feature embedding for the registered user's utterance and feature embeddings for synthesis results between the registered user's utterance and a plurality of environmental noises.

DETAILED DESCRIPTION

Figure 1:
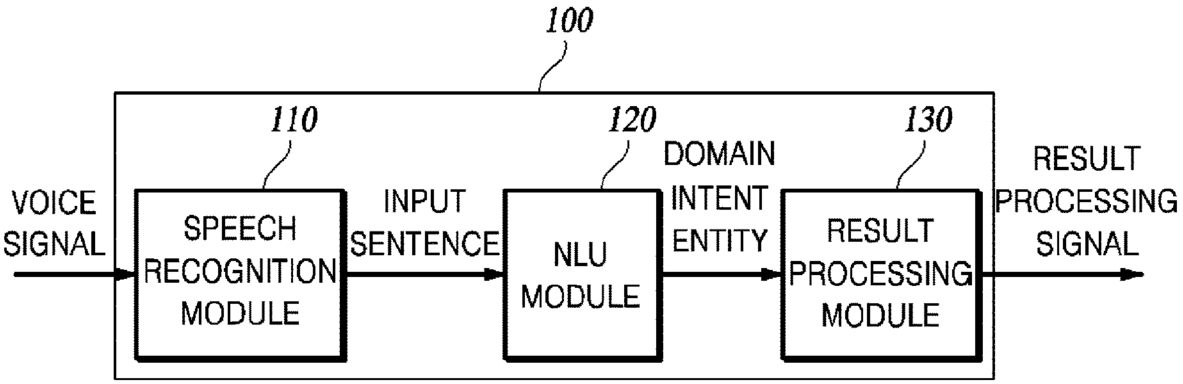
FIG. 1 is a configuration diagram of a speech recognition system according to an embodiment.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

In view of the above, the present disclosure provides a method and device for improving the performance of user authentication based on speech recognition even in various noise environments of vehicles.

The problems to be solved by the present disclosure are not limited to the problems mentioned above, and other problems not mentioned may be clearly understood by those skilled in the art from the description below.

Embodiments of the present disclosure are described below in detail using various drawings. It should be noted that when reference numerals are assigned to components in each drawing, the same components have the same reference numerals as much as possible, even if they are displayed on different drawings. Furthermore, in the description of the present disclosure, where it has been determined that a specific description of a related known configuration or function may obscure the gist of the disclosure, a detailed description thereof has been omitted.

In describing the components of the embodiments according to the present disclosure, symbols such as first, second, i), ii), a), and b) may be used. These symbols are only used to distinguish components from other components. The identity or sequence or order of the components is not limited by the symbols. In the specification, when a part "includes" or is "equipped with" an element, this means that the part may further include other elements, not excluding other elements unless explicitly stated to the contrary. Further, when an element in the written description and claims is described as being "for" performing or carry out a stated function, step, set of instructions, or the like, the element may also be considered as being "configured to" do so.

Each component of a device or method according to the present disclosure may be implemented in hardware or software, or in a combination of hardware and software. In addition, the functions of each component may be implemented in software. A microprocessor or processor may execute functions of the software corresponding to each component.

FIG. 1 is a configuration diagram of a speech recognition system according to an embodiment.

Referring to FIG. 1, a speech recognition system 100 recognizes and understands a user's utterance and provides a service corresponding to the user's utterance.

To this end, the speech recognition system 100 includes a speech recognition module 110 that transforms the user's voice utterance into text, a natural language understanding (NLU) module 120 that determines an intent included in the user's voice utterance, and a result processing module 130 that performs processing to provide results corresponding to the user's intent.

The speech recognition module 110 may be implemented as a STT (Speech to Text) engine and may transform the user's utterance, which is a speech signal, into text by applying a speech recognition algorithm.

For example, the speech recognition module 110 may extract feature vectors from the user's utterance by applying feature vector extraction technology, such as cepstrum, linear predictive coefficient (LPC), mel frequency cepstral coefficient (MFCC), or filter bank energy.

The speech recognition module 110 may obtain recognition results by comparing the extracted feature vectors with a trained reference pattern. To this end, an acoustic model that models and compares signal characteristics of speech or a language model that models the linguistic order relationship of words or syllables corresponding to recognition vocabulary may be used.

The speech recognition module 110 may also transform user's utterance into text based on a model employing machine learning or deep learning.

The NLU module 120 determines the user intent included in the input sentence using natural language understanding technology. Here, the input sentence refers to the text transformed by the speech recognition module 110.

The NLU module 120 may extract information, such as a domain, an entity name, and speech act from the input sentence and recognize an intent and an entity according to the intent based on an extraction result.

For example, if the input sentence is "Let's go home," the domain is [Navigation], the intent is [Route Setting], and the entities required to perform control corresponding to the intent are [Origin, Destination]. As another example, if the input sentence is "Turn on the air conditioner," the domain is [vehicle control], the intent is [air conditioner power on], and the entities required to perform the control corresponding to the intent are [temperature, wind volume].

The result processing module 130 may output a result processing signal to a vehicle, user device, or external server in order to perform processing to provide a service corresponding to the user's intent.

For example, when the service corresponding to the user's intent is vehicle-related control, the result processing module 130 may transmit the result processing signal to perform vehicle-related control to the vehicle. As another example, when the service corresponding to the user's intent is the provision of specific information, the result processing module 130 may search for specific information and provide searched information to the user terminal. If necessary, information search may also be performed on another external server. As another example, when the service corresponding to the user's intent is the provision of specific content, the result processing module 130 may request transmission of target content from an external server that provides the content. In another example, when the service corresponding to the user's intent is the continuation of a simple conversation, the result processing module 130 may generate a response to the user's utterance and output a response visually or auditorily.

The speech recognition system 100 may be provided on an external server or a user terminal, and some of the components thereof may be provided in the external server and other components may be provided in the user terminal. The user terminal may be a mobile device, such as a smartphone, tablet PC, or wearable device, a home appliance with a user interface, or a vehicle.

The speech recognition system 100 may further include a dialogue manager that manages the overall conversation between the speech recognition system 100 and the user.

The components of the speech recognition system 100 are classified based on operations or functions thereof, and all or some of them may share memory or a processor.

The speech recognition system 100 may be implemented in either a vehicle or a server. Otherwise, some of the components of the speech recognition system 100 may be included in the vehicle, and the others may be included in the server. For example, the vehicle transmits an occupant's voice signal to the server, and the server processes the occupant's voice signal, generates information or a control command necessary for the occupant, and transmits the information or control command to the vehicle.

Meanwhile, the speech recognition system 100 may provide a response to the occupant's request through conversation with the occupant, but for a security purpose, it is necessary to confirm whether the occupant is a user authorized to use the speech recognition system 100.

According to one embodiment of the present disclosure, a method for user authentication may be performed in the speech recognition module 110 or in front of the speech recognition module 110.

Figure 2:
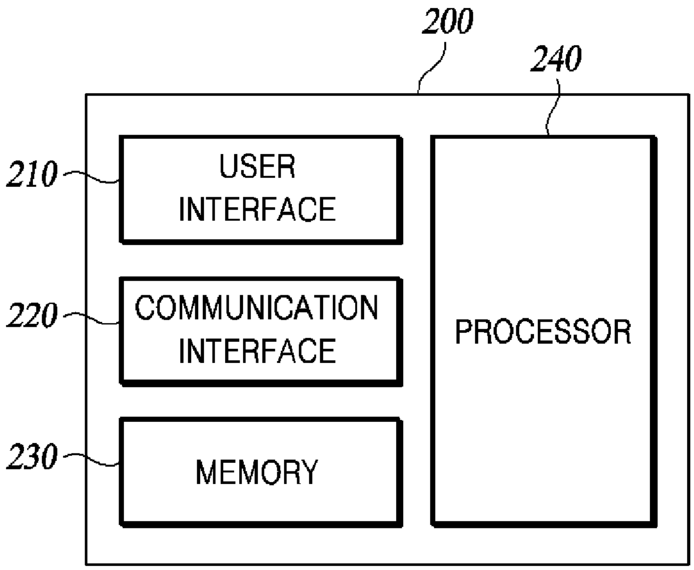
FIG. 2 is a configuration diagram of a user authentication device according to an embodiment of the present disclosure.

FIG. 2 is a configuration diagram of a user authentication device according to an embodiment of the present disclosure.

Referring to FIG. 2, a user authentication device 200 registers feature embeddings for the user's low-noise utterance and feature embeddings for the results of synthesizing various noises with the user's utterance in a user registration operation, and confirms whether the occupant is a registered user by comparing an input embedding for the vehicle occupant's utterance with the registered feature embeddings in a user authentication process. Through this, the user authentication device 200 may accurately determine whether the occupant is a registered user by using reference embedding for each noise even if the occupant's voice utterance includes noise in the user authentication operation.

To this end, the user authentication device 200 includes a memory 230 and a processor 240. The user authentication device 200 may further include at least one of a user interface 210 or a communication interface 220.

The user authentication device 200 may be implemented in a vehicle or an external server. When the user authentication device 200 is provided in a vehicle, the user authentication device 200 may include the user interface 210, such as a microphone, the memory 230, and the processor 240, and may further include the communication interface 220. When the user authentication device 200 is provided in the server, the user authentication device 200 may include the communication interface 220, the memory 230, and the processor 240, and may further include the user interface 210. Hereinafter, it is assumed that the user authentication device 200 is implemented in a server.

The user interface 210 may include an input device, such as a microphone that transforms the user's voice utterance into an electrical signal, a camera that images the user inside the vehicle, or a touch panel that receives the user's touch input. Furthermore, the user interface 210 may include an output device, such as a display device for responding to the user's voice utterance or providing vehicle status information, and a speaker for outputting sound necessary for vehicle-related control or provision of a service desired by the user. The user may trigger execution of a program by the processor 240 through the user interface 210.

The communication interface 220 provides access to external devices. For example, the user authentication device 200 may communicate with other devices through the communication interface 220.

As an example, the communication interface 220 may receive data for speech recognition from the vehicle and may communicate with a device inside the vehicle or a user's terminal device to execute voice commands.

The communication interface 220 is a hardware device implemented with various electronic circuits to transmit and receive signals through wireless or wired connections. In the present disclosure, the communication interface 220 may perform communication using in-vehicle network communication technology and may perform V2I communication with a server, an infrastructure, or other vehicles outside the vehicle using wireless Internet access or short-range communication technology. Here, using the vehicle network communication technology, the communication interface 220 may perform in-vehicle communication through controller area network (CAN) communication, local interconnect network (LIN) communication, flex-ray communication, etc. In addition, wireless communication technologies may include wireless LAN (WLAN), wireless broadband (Wibro), Wi-Fi, and world interoperability for microwave access (Wimax). In addition, short-range communication technologies may include Bluetooth, ZigBee, ultra-wideband (UWB), radio frequency identification (RFID), and infrared data association (IrDA).

The memory 230 may store a program that causes the processor 240 to perform a user authentication method according to an embodiment of the present disclosure. For example, the program may include a plurality of instructions executable by the processor 240, and the user authentication method may be performed by executing the plurality of instructions by the processor 240.

The memory 230 may maintain stored data even when power supplied to the user authentication device 200 is cut off.

The memory 230 may be a single memory or a plurality of memories. In this case, information required for data generation may be stored in a single memory or may be divided to be stored in the plurality of memories. When the memory 230 includes a plurality of memories, the plurality of memories may be physically separated.

The memory 230 may include at least one of volatile memory and non-volatile memory. The volatile memory includes static random access memory (SRAM) or dynamic random access memory (DRAM), and non-volatile memory includes flash memory.

The processor 240 may be electrically connected to the user interface 210, the communication interface 220, and the memory 230, and may electrically control each component.

The processor 240 may execute instructions stored in the memory 230. The processor 240 may include at least one core capable of executing at least one instruction. The processor 240 may be a single processor or a plurality of processors.

According to an embodiment of the present disclosure, the processor 240 may perform a user registration process and a user authentication process to determine whether the occupant in the vehicle is a registered user. The user registration process refers to a process of storing voice utterances of a registered user who has authority for a speech recognition system of the vehicle, and the user authentication process refers to a process of determining whether the occupant is the registered user based on a voice utterance of the occupant.

As the user registration process, the processor 240 requests the user to utter a predetermined sentence, transforms the user's voice utterance into an embedding vector, and stores the embedding vector in the memory 250.

In particular, the processor 240 stores in the memory 250 not only a feature embedding for the user's speech, but also the feature embeddings for the results of synthesizing various noises with the user's speech. That is, feature embeddings for the user's clean utterances and utterances containing noise are stored. the registration of the user is completed.

The processor 240 may store feature embeddings for each of multiple users.

Thereafter, in the user authentication process, the processor 240 may increase the accuracy of user authentication of the occupant even in a noisy environment by using the feature embeddings for both the user's clean utterances and utterances containing noise.

Specifically, the processor 240 receives input audio including the occupant's utterance. The processor 240 may receive input audio from the vehicle. Thereafter, the processor 240 transforms the input audio into an input embedding and compares the input embedding with pre-stored feature embeddings to determine whether the occupant is a registered user.

Here, the input audio may include noise depending on a vehicle environment.

If the occupant is a registered user, the processor 240 notifies the vehicle that the occupant is a registered user.

Furthermore, the processor 240 grants the authority to control the speech recognition system to the occupant. The occupant may receive a necessary service using the speech recognition system. Furthermore, the occupant may also control the vehicle through a voice command.

Meanwhile, the processor 240 may perform at least some of the functions of the speech recognition system 100. That is, the processor 240 may implement at least one function of the speech recognition module 110, the NLU module 120, and the result processing module 130.

Meanwhile, in another embodiment, the user authentication device 200 may be implemented in the vehicle. The user authentication device 200 may receive input audio through a microphone of the vehicle, perform authentication on the occupant, and control the vehicle based on the voice command of the authenticated occupant.

Figure 3:
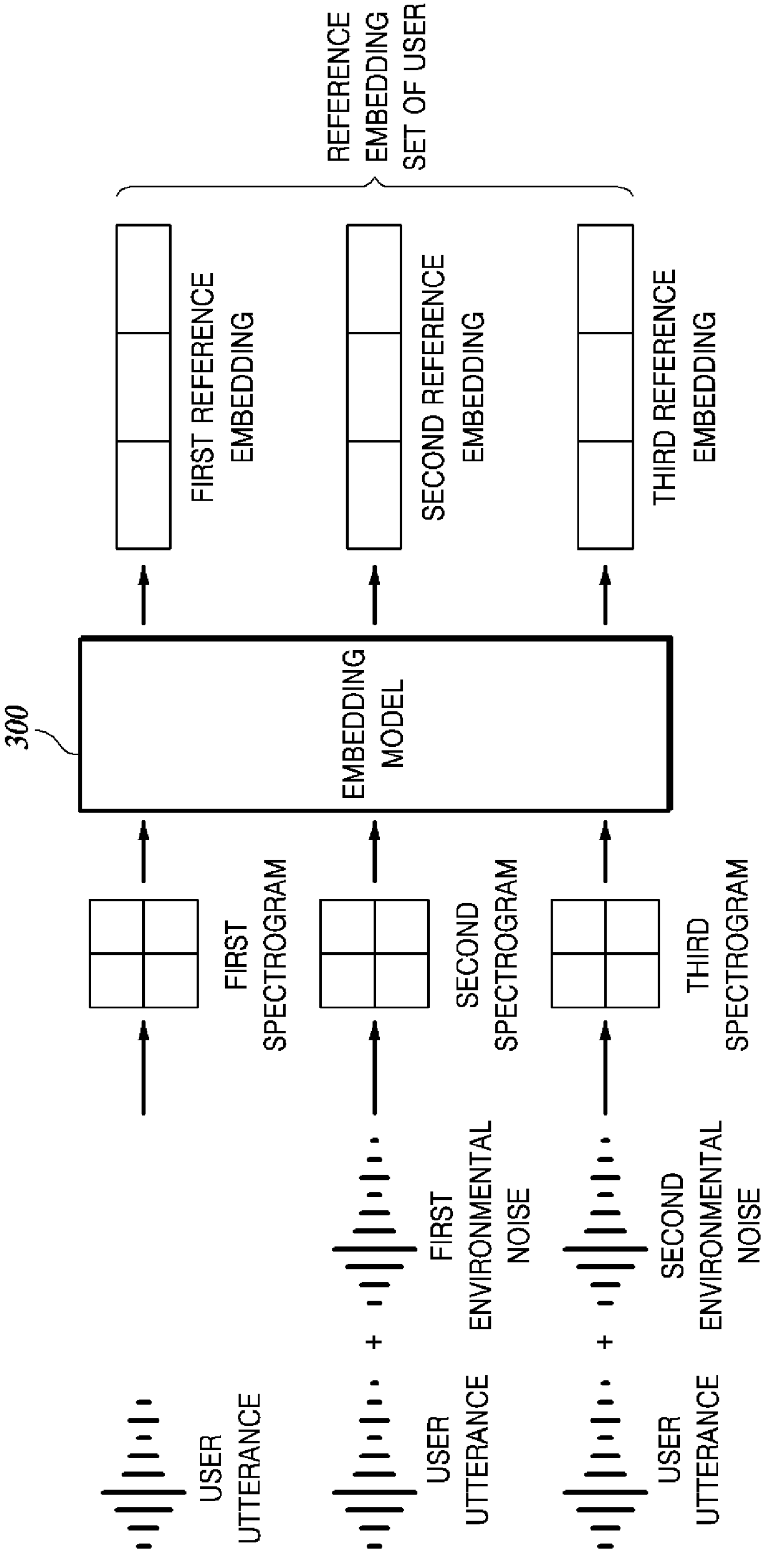
FIG. 3 is a diagram illustrating user registration according to an embodiment of the present disclosure.

FIG. 3 is a diagram illustrating user registration according to an embodiment of the present disclosure.

Referring to FIG. 3, a process in which the user authentication device generates a reference embedding set for the user using an embedding model 300 and performs user registration by using the reference embedding set to is shown. The user registration process may be started by the user's vehicle operation or may be started through the user's terminal device.

First, the user authentication device receives the user utterance as input. When the user authentication device is provided in the vehicle, the user authentication device requests the user to utter a predetermined sentence and receives the user utterance of the predetermined sentence through the microphone. When the user authentication device is provided in the server, the user utterance is received from the vehicle.

Here, the user utterance may be in the form of audio representing a one-dimensional vector with a magnitude of a signal as an element value in a time domain.

Meanwhile, the user authentication device may request the user to utter a sentence in an environment with minimal surrounding noise. Specifically, the user authentication device measures at least one of a noise level before the user utters or a noise level after the user utters. As an example, the user authentication device may measure a root mean square (RMS) for noise in a section before or after a user utterance section according to a voice start point (begin of speech (BoS)) and a voice end point (end of speech (EoS)). If the measured at least one noise level is higher than a preset noise threshold, the user authentication device may request the user to proceed with registration in an environment with a noise level lower than the noise threshold.

Thereafter, the user authentication device synthesizes the user utterance with a plurality of environmental noises.

To this end, the user authentication device stores a plurality of environmental noises having different acoustic characteristics in advance. The plurality of environmental noises may include noises according to various environments of the vehicle, such as noise due to rain, noise due to an operation of an air-conditioner, or noise due to wind. These environmental noises may be collected by the microphone within the vehicle.

As an example, the user authentication device may synthesize a user utterance with first environmental noise and may synthesize the user utterance with second environmental noise. Here, the first environmental noise may be rain noise, and the second environmental noise may be air-conditioner noise.

The user authentication device transforms the user utterance and synthesis results into spectrograms. The user authentication device transforms the user utterance into a first spectrogram, transforms the synthesis result of the user utterance and the first environment noise into a second spectrogram, and transforms the synthesis result of the user utterance and the second environment noise into a third spectrogram.

Here, the spectrogram is a two-dimensional image in which the horizontal axis represents time, the vertical axis represents frequency, and an element value is a magnitude of a frequency component.

The user authentication device transforms the user utterance and synthesis results expressed in the time domain into spectrograms expressed in the time-frequency domain. The user authentication device may perform spectrogram transformation using various methods, such as FFT (Fast Fourier Transform), STFT (Short Time Fourier Transform), Chroma-STFT, Chroma-CQT, and Chroma-CQT (Constant-Q Transform).

In another embodiment, the user authentication device may perform synthesis in a spectrogram operation. The user authentication device may transform audio data for the user utterance into a first spectrogram, transform the first environmental noise into a noise spectrogram, and synthesize the first spectrogram and the noise spectrogram to generate a spectrogram for the utterance mixed with noise.

The user authentication device generates a reference embedding set from spectrograms using the embedding model 300.

Specifically, the user authentication device inputs the spectrogram into the embedding model 300, and the embedding model 300 processes the spectrogram and outputs probability information including probability values for each class. Here, the classes relate to speakers. The spectrogram is processed in the form of a plurality of layers through parameters of the embedding model 300. The embedding model 300 includes an input layer, hidden layers, and an output layer, and each layer represents an intermediate result of processing the spectrogram. The user authentication device acquires the hidden layer closest to the output layer among the hidden layers in the embedding model 300, as a reference embedding.

Here, the embedding model 300 is a model of a neural network structure trained to transform a spectrogram into a vector.

The embedding model 300 may be supervised by a training device. First, as a training data set for the embedding model 300, a training spectrogram transformed from training audio data and a label for the training spectrogram are prepared. The label may be in the form of a one-hot encoded vector. The embedding model 300 receives the training spectrogram as input and outputs class probability information. Here, the class probability information is a vector having the same dimension as the label. The training device updates the parameters of the embedding model 300 so that a difference between the output class probability information and the label of the training spectrogram is reduced. In other words, the embedding model 300 is trained to output the label of the training spectrogram from the training spectrogram.

Alternatively, or supplementally, the embedding model 300 may be trained using other training methods, such as unsupervised learning or reinforcement learning.

The embedding model 300 may be configured as a deep neural network and may have various neural network structures. For example, the embedding model 300 may have a variety of neural network structures capable of implementing image processing techniques, such as a convolutional neural network (CNN), a recurrent neural network (RNN), or a combined structure of RNN and CNN.

Meanwhile, each reference embedding is the result of extracting the features of a corresponding spectrogram. That is, each reference embedding is a feature embedding for user utterances or synthesized results. In detail, a first reference embedding is a feature embedding for a user utterance collected in a quiet environment. A second reference embedding represents the features of the user utterance in a rainy environment, and a third reference embedding represents the features of the user utterance in an environment with an air-conditioner turned on.

The user authentication device completes user registration by storing the reference embedding set as the user's personal data.

The stored reference embedding set is later used for user authentication.

The user authentication device may store reference embedding sets for multiple users in advance.

Figure 4:
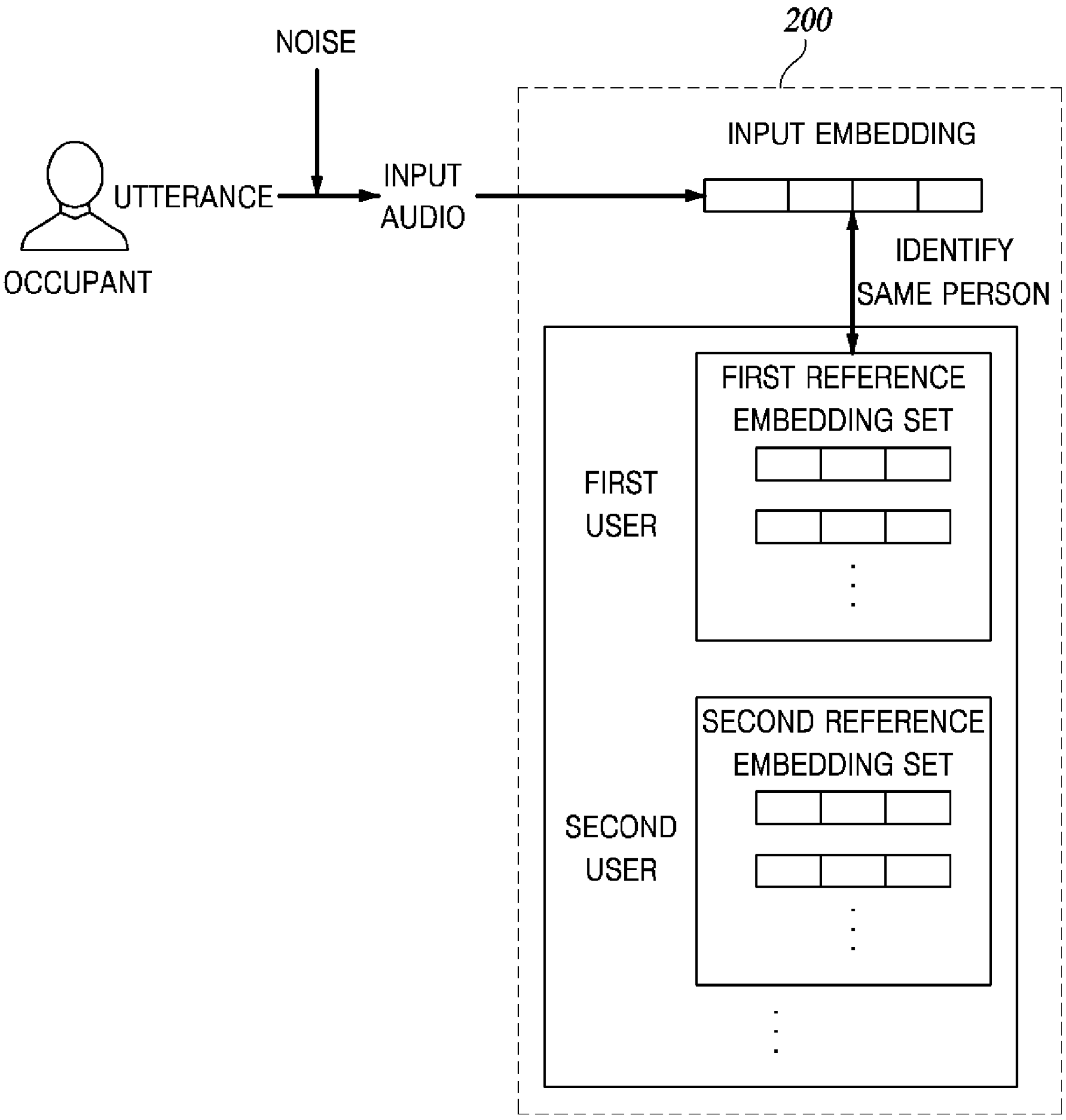
FIG. 4 is a diagram illustrating user authentication according to an embodiment of the present disclosure.

FIG. 4 is a diagram illustrating user authentication according to an embodiment of the present disclosure.

Referring to FIG. 4, the user authentication device 200 determines whether the occupant is a registered user based on comparison between the input embedding for the utterance of the vehicle occupant and the pre-stored reference embedding set for each user, thereby performing the user authentication process.

First, the user authentication device 200 receives input audio according to the utterance of the vehicle occupant. Here, the input audio may include noise depending on a vehicle environment as well as the occupant's utterance. Environmental noise may refer to rain noise, air-conditioner noise, or wind noise.

When the user authentication device 200 is installed in the vehicle, the user authentication device 200 requests the occupant to utter a predetermined sentence and receives the occupant's utterance of the predetermined sentence through the microphone. Here, the predetermined sentence may be the same as or partially different from the sentence used for user registration. Meanwhile, when the user authentication device 200 is provided in the server, input audio collected by the vehicle is received from the vehicle.

The user authentication device 200 transforms the input audio into input embedding. The user authentication device 200 may transform the input audio into an input spectrogram and transform the input spectrogram into an input embedding using an embedding model.

Thereafter, the user authentication device 200 determines whether the occupant is a registered user by comparing the occupant's input embedding with the reference embedding sets.

The user authentication device 200 may calculate a similarity score between the input embedding and the reference embedding set and determine whether the occupant is a registered user based on the similarity score. Here, the similarity score may refer to cosine similarity, Euclidean distance, or Jacquard similarity for determining similarity between vectors. Hereinafter, the similarity score represents cosine similarity.

As an example, the user authentication device 200 calculates a similarity score between the occupant's input embedding and a first reference embedding set of a first user.

At this time, the first reference embedding set includes a reference embedding for a noise-free utterance of the first user and reference embeddings for results of synthesizing environmental noise with the utterance. The user authentication device 200 calculates similarity scores between the input embedding and each reference embedding, and calculates the sum or average of the similarity scores as a similarity score between the input embedding and the first reference embedding set.

The user authentication device 200 determines whether the occupant is a registered user based on the calculated similarity score. If the calculated similarity score is higher than a preset threshold score, the user authentication device 200 may determine that the occupant is a registered first user.

Meanwhile, if the calculated similarity score is lower than the preset threshold score, the user authentication device 200 determines that the occupant is not the first user, and compares the input embedding with a second reference embedding set to determine that the occupant is the same person as a second user.

If the occupant is a registered user, the user authentication device 200 may transmit a determination result of the occupant's registration to the vehicle. When the user authentication device 200 is implemented in the vehicle, the user authentication device 200 grants the authority to control of the speech recognition system to the occupant, and the speech recognition system controls the vehicle or provides a requested service according to the occupant's voice command.

The user authentication device 200 may accurately determine whether the occupant is a registered user by using the reference embedding for each noise even if the occupant's voice utterance includes noise in the user authentication operation.

Figure 5:
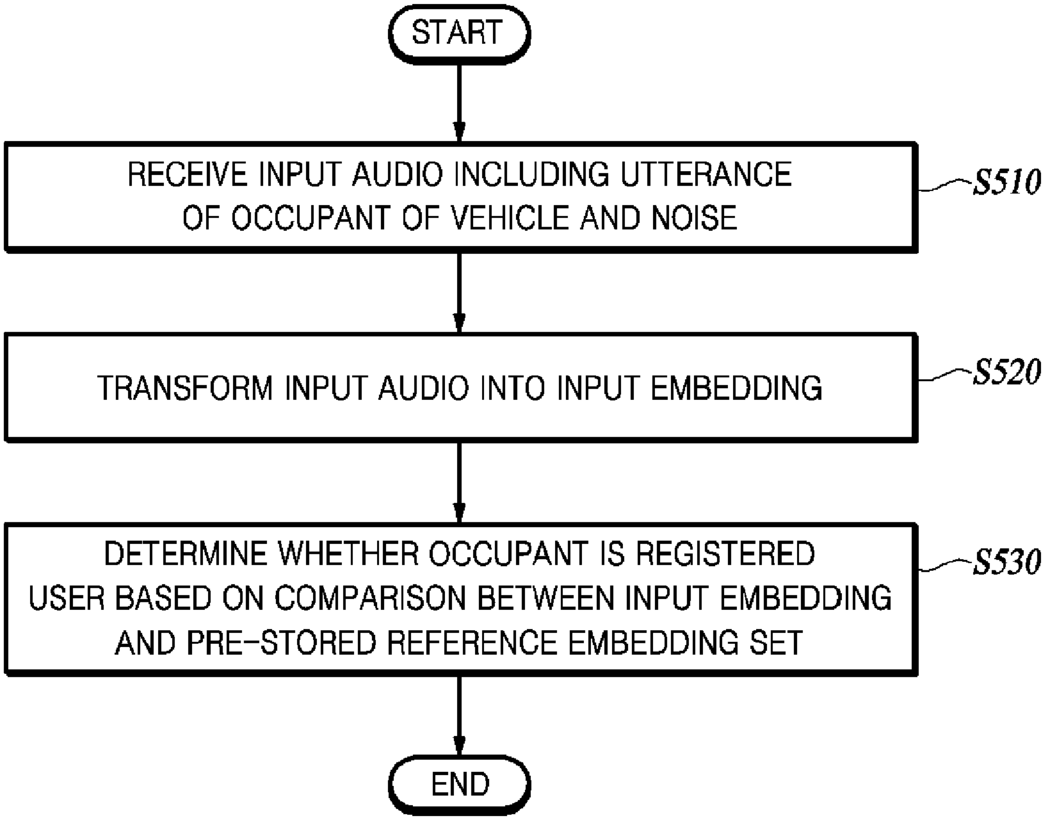
FIG. 5 is a flowchart of a user authentication method according to an embodiment of the present disclosure.

FIG. 5 is a flowchart of a user authentication method according to an embodiment of the present disclosure.

Referring to FIG. 5, the user authentication device receives input audio including utterance of an occupant of a vehicle and noise (S510).

When the user authentication device is implemented in a server, the user authentication device may receive input audio from the vehicle. When the user authentication device is implemented in a vehicle, the user authentication device may acquire input audio through the microphone of the vehicle.

Noise included in the input audio may include various sounds generated in the vehicle.

The user authentication device transforms the input audio into an input embedding (S520).

The user authentication device transforms the input audio into an input spectrogram using Fourier transform and transforms the input spectrogram into an input embedding using an embedding model.

The user authentication device determines whether the occupant is the registered user based on comparison between the input embedding and a previously stored reference embedding set (S530).

Here, the reference embedding set includes a plurality of reference embeddings, and the reference embeddings include a feature embedding for the registered user's low-noise utterance and feature embeddings for synthesis results between the registered user's utterance and a plurality of environmental noises. The plurality of environmental noises are sound noises having different acoustic characteristics.

Meanwhile, the registered user may be registered in an environment in which at least one of a noise level before the registered user's utterance or a noise level after the registered user's utterance is lower than a noise threshold.

For user authentication, the user authentication device calculates a similarity score between the input embedding and the reference embedding set. The user authentication device determines whether the occupant is the registered user based on the similarity score.

If the calculated similarity score is higher than a threshold score, the user authentication device may determine that the occupant is the registered user.

If the occupant is the registered user, the user authentication device may transmit a determination result of the occupant's registration to the vehicle. When the user authentication device is implemented in a vehicle, the user authentication device may grant the authority to control of the speech recognition system to the occupant.

As described above, according to an embodiment of the present disclosure, the performance of user authentication based on speech recognition may be improved even in various noise environments of vehicles.

The effects of the present disclosure are not limited to the effects mentioned above, and other effects not mentioned may be clearly understood by those skilled in the art from the description below.

At least some of the components described in the exemplary embodiments of the present disclosure may be implemented as hardware elements including at least one of a Digital Signal Processor (DSP), a processor, a controller, an Application-Specific IC (ASIC), a programmable logic devices (FPGA, etc.), other electronic components, or a combination thereof. Moreover, at least some of the functions or processes described in the exemplary embodiments may be implemented as software, and the software may be stored in a recording medium. At least some of the components, functions, and processes described in the exemplary embodiments of the present disclosure may be implemented as a combination of hardware and software.

The method according to the exemplary embodiments of the present disclosure may be written as a program that can be executed on a computer and may also be implemented as various recording media such as magnetic storage media, optical reading media, digital storage media, etc.

Various techniques described herein may be implemented in digital electronic circuitry, or in computer hardware, firmware, software, or combinations thereof implementations may be in the form of a computer program tangibly embodied in a computer program product, i.e., an information carrier, e.g., a machine-readable storage device (computer-readable medium) or a propagated signal, for processing by, or controlling, the operation of, a data processing device, e.g., a programmable processor, a computer, or a number of computers. A computer program, such as the above-mentioned computer program(s), may be written in any form of programming language, including compiled or interpreted languages and may be deployed in any form, including as a stand-alone program or as a module, component, subroutine, or other unit suitable for use in a computing environment. The computer program may be deployed to run on a single computer or multiple computers at one site or distributed across multiple sites and interconnected by a communications network.

In addition, components of the present disclosure may use an integrated circuit structure such as a memory, a processor, a logic circuit, a look-up table, and the like. These integrated circuit structures execute each of the functions described herein through the control of one or more microprocessors or other control devices. In addition, components of the present disclosure may be specifically implemented by a program or a portion of a code that includes one or more executable instructions for performing a specific logical function and is executed by one or more microprocessors or other control devices. In addition, components of the present disclosure may include or be implemented as a Central Processing Unit (CPU), a microprocessor, etc. that perform respective functions. In addition, components of the present disclosure may store instructions executed by one or more processors in one or more memories.

Processors suitable for processing computer programs include, by way of example, both general purpose and special purpose microprocessors, as well as one or more processors of any kind of digital computer. Generally, a processor will receive instructions and data from a read-only memory or a random access memory or both. The essential elements of a computer may include at least one processor that executes instructions and one or more memory devices that store instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include, by way of example, semiconductor memory devices, e.g., Magnetic Media such as hard disks, floppy disks, and magnetic tapes, Optical Media such as Compact Disk Read Only Memories (CD-ROMs) and Digital Video Disks (DVDs), Magneto-Optical Medial such as Floptical Disks, Rea Only Memories (ROMs), Random Access Memories (RAMs), flash memories, Erasable Programmable ROMs (EPROMs), Electrically Erasable Programmable ROMs (EEPROM), etc. The processor and the memory may be supplemented by, or incorporated in, special purpose logic circuitry.

The processor may execute an Operating System and software applications executed on the Operating System. Moreover, a processor device may access, store, manipulate, process, and generate data in response to software execution. For the sake of convenience, there is a case where a single processor device is used, but those skilled in the art will understand that the processor device can include multiple processing elements and/or multiple types of processing elements. For example, the processor device may include a plurality of processors or a single processor and a single controller. Other processing configurations, such as such as parallel processors, are also possible.

In addition, non-transitory computer-readable media may be any available media that can be accessed by a computer, and may include both computer storage media and transmission media.

This specification includes details of various specific implementations, but they should not be understood as limiting the scope of any invention or what is claimed, and should be understood as descriptions of features that may be unique to particular embodiments of a particular invention. In the context of individual embodiments, specific features described herein may also be implemented in combination with a single embodiment. On the contrary, various features described in the context of a single embodiment can also be implemented in multiple embodiments independently or in any appropriate sub-combination. Further, although the features may operate in a particular combination and may be initially described as so claimed, one or more features from the claimed combination may be in some cases excluded from the combination, and the claimed combination may be modified into a sub-combination or a variation of the sub-combination.

Likewise, although the operations are depicted in the drawings in a particular order, it should not be understood that such operations must be performed in that particular order or sequential order shown to achieve the desirable result or that all the depicted operations should be performed. In certain cases, multitasking and parallel processing may be advantageous. Moreover, the separation of various device components of the above-described embodiments should not be understood as requiring such separation in all embodiments, and it should be understood that the described program components and devices can generally be integrated together in a single software product or packaged into multiple software products.

The foregoing description is merely illustrative of the technical concept of the present embodiments. Various modifications and changes may be made by those of ordinary skill in the art without departing from the essential characteristics of each embodiment. Therefore, the present embodiments are not intended to limit but to describe the technical idea of the present embodiments. The scope of the technical concept of the embodiments is not limited by these embodiments. The scope of protection of the various embodiments should be construed by the following claims. All technical ideas that fall within the scope of equivalents thereof should be interpreted as being included in the scope of the present embodiments.

What is claimed is:

1. A device for user authentication of an occupant in a vehicle, the device comprising:

a memory configured to store a reference embedding set including a feature embedding for a registered user's utterance and feature embeddings for synthesis results between the registered user's utterance and a plurality of environmental noises;

a user interface configured to receive input audio including an utterance of an occupant of the vehicle and noise; and a processor configured to transform the input audio to an input embedding, and determine whether the occupant is a registered user based on a comparison between the input embedding and the reference embedding set wherein the registered user is registered in an environment in which at least one of a noise level before the registered user's utterance or a noise level after the registered user's utterance is lower than a noise threshold.

2. The device of claim 1, wherein the user interface comprises a microphone for capturing the utterance of the occupant.

3. The device of claim 1, wherein the processor is configured to transform the input audio into an input spectrogram and transform the input spectrogram into the input embedding using an embedding model.

4. The device of claim 1, wherein the processor is configured to calculate a similarity score between the input embedding and the reference embedding set, and determine whether the occupant is the registered user based on the similarity score.

5. The device of claim 1, wherein the plurality of environmental noises include noises with different acoustic characteristics.

6. The device of claim 1, wherein the processor is configured to receive the input audio from the vehicle and transmit a determination result of the occupant's registration to the vehicle.

7. A vehicle comprising the device of claim 1.

8. A computer-implemented method for user authentication of a vehicle, the computer-implemented method comprising:

receiving, by a user interface, input audio including an utterance of an occupant of the vehicle and noise;

transforming, by a processor, the input audio to an input embedding; and determining, by the processor, whether the occupant is a registered user based on a comparison between the input embedding and a pre-stored reference embedding set, the reference embedding set including a feature embedding for the registered user's utterance and feature embeddings for synthesis results between the registered user's utterance and a plurality of environmental noises;

wherein the registered user is registered in an environment in which at least one of a noise level before the registered user's utterance or a noise level after the registered user's utterance is lower than a noise threshold.

9. The method of claim 8, wherein the user interface comprises a microphone.

10. The method of claim 8, wherein the transforming includes:

transforming the input audio into an input spectrogram; and transforming the input spectrogram to the input embedding using an embedding model.

11. The method of claim 8, wherein the determining includes:

calculating a similarity score between the input embedding and the reference embedding set; and determining whether the occupant is the registered user based on the similarity score.

12. The method of claim 8, wherein the plurality of environmental noises have different acoustic characteristics.

13. The method of claim 8, further comprising:

transmitting a determination result of the occupant's registration to the vehicle.

14. A non-transitory computer readable medium containing program instructions executed by a processor, the computer readable medium comprising:

program instructions that receive input audio including an utterance of an occupant of the vehicle and noise;

program instructions that transform the input audio to an input embedding; and program instructions that determine whether the occupant is a registered user based on a comparison between the input embedding and a pre-stored reference embedding set, the reference embedding set including a feature embedding for the registered user's utterance and feature embeddings for synthesis results between the registered user's utterance and a plurality of environmental noises;

wherein the registered user is registered in an environment in which at least one of a noise level before the registered user's utterance or a noise level after the registered user's utterance is lower than a noise threshold.

15. The non-transitory computer readable medium of claim 14, further comprising:

program instructions that transform the input audio into an input spectrogram; and program instructions that transform the input spectrogram to the input embedding using an embedding model.

16. The non-transitory computer readable medium of claim 15, further comprising:

program instructions that calculate a similarity score between the input embedding and the reference embedding set; and program instructions that determine whether the occupant is the registered user based on the similarity score.

17. The non-transitory computer readable medium of claim 14, wherein the plurality of environmental noises have different acoustic characteristics.

* * * * *